United States Patent
Wharton et al.

(10) Patent No.: US 9,319,411 B2
(45) Date of Patent: Apr. 19, 2016

(54) SECURITY MANAGEMENT FOR CLOUD SERVICES

(71) Applicant: PROXIMITUM LIMITED, Aylesbury (GB)

(72) Inventors: James Wharton, Aylesbury (GB); David Worrall, Worcester Park (GB)

(73) Assignee: Proximitum Limited, Aylesbury (GB)

( * ) Notice: Subject to any disclaimer, the term of this patent is extended or adjusted under 35 U.S.C. 154(b) by 0 days.

(21) Appl. No.: 14/333,405

(22) PCT Filed: Jan. 15, 2013

(86) PCT No.: PCT/GB2013/050073
§ 371 (c)(1),
(2) Date: Jul. 16, 2014

(87) PCT Pub. No.: WO2013/108018
PCT Pub. Date: Jul. 25, 2013

(65) Prior Publication Data
US 2015/0106881 A1    Apr. 16, 2015

(30) Foreign Application Priority Data

Jan. 17, 2012 (GB) .................................. 1200703.5

(51) Int. Cl.
| | | |
|---|---|---|
| *H04L 29/06* | (2006.01) | |
| *H04L 29/08* | (2006.01) | |
| *G06F 7/04* | (2006.01) | |
| *G06F 12/00* | (2006.01) | |
| *G06F 12/14* | (2006.01) | |
| *G06F 13/00* | (2006.01) | |
| *G06F 17/30* | (2006.01) | |
| *G06F 9/50* | (2006.01) | |

(52) U.S. Cl.
CPC ................ *H04L 63/10* (2013.01); *H04L 63/08* (2013.01); *H04L 67/1097* (2013.01); *G06F 9/5072* (2013.01)

(58) Field of Classification Search
None
See application file for complete search history.

(56) References Cited

U.S. PATENT DOCUMENTS

| | | | | |
|---|---|---|---|---|
| 2007/0101418 | A1* | 5/2007 | Wood et al. | 726/8 |
| 2011/0107398 | A1* | 5/2011 | Earl et al. | 726/3 |
| 2011/0265157 | A1 | 10/2011 | Ryder | |
| 2012/0179904 | A1* | 7/2012 | Dunn et al. | 713/155 |
| 2013/0061306 | A1* | 3/2013 | Sinn | 726/7 |
| 2013/0067550 | A1* | 3/2013 | Chen et al. | 726/7 |
| 2013/0117337 | A1* | 5/2013 | Dunham | 707/827 |

FOREIGN PATENT DOCUMENTS

| | | |
|---|---|---|
| EP | 1830520 A1 | 9/2007 |
| WO | 03/046748 A1 | 6/2003 |

OTHER PUBLICATIONS

Grimshaw et al., "An Open Grid Services Architecture Primer", IEEE Computer Society, Feb. 2009, pp. 27-34.
Dijiang Huang, et al., "Secure Data Processing Framework for Mobile Cloud Computing", IEEE Infocom Computer Communications Workshop, Apr. 10, 201, pp. 614-618, XP031949987.
Yona Raekow, et al, "License Management in Grid and Cloud Computing", 2010 International Conference on P2P, Parallel, Grid, Cloud and Internet Computing, Nov. 1, 2010, pp. 9-15, XP031831159.

* cited by examiner

*Primary Examiner* — Shin-Hon Chen
(74) *Attorney, Agent, or Firm* — Baker & Hostetler LLP

(57) ABSTRACT

A cloud management node (102) in a public cloud (100) works together with a private management system (116) in a private cloud (114) to manage provisioning and access to cloud services from the private cloud (114). Private data does not need to be held or duplicated in the public cloud so that the data security is enhanced. The private management system (116) issues tokens for authorization so that user access to cloud services may be controlled. The cloud management node (102) receives provisioning requests from the private cloud (114) and selects and informs an appropriate service provider node (112) that a provisioning request is waiting. In examples an administrator at the private cloud (114) is able to manage cloud service access for many users in a simple effective manner and users are able to operate multiple cloud services from a single account.

19 Claims, 12 Drawing Sheets

SECURITY MANAGEMENT FOR CLOUD SERVICES

CROSS-REFERENCE TO RELATED APPLICATIONS

This application is a National Stage of International patent application PCT/GB2013/050073, filed on Jan. 15, 2013, which claims priority to foreign United Kingdom patent application No. GB 1200703.5, filed on Jan. 17, 2012, the disclosures of which are incorporated by reference in their entirety.

BACKGROUND

Cloud services such as software applications and/or computing resources provided over the internet, an intranet or other communications network are increasingly widespread in many domains. For example, in the fields of document management, image processing, passport control systems, database access, information retrieval and others.

Many different service providers exist with different types of service provider nodes in the network using different communications protocols and equipment. End users typically register with each different service provider they wish to use and may open an account with each different service provider. Communications between end user equipment and the various heterogeneous service provider nodes proceeds according to the various different communications protocols of the service provider equipment. Typically authentication and authorization processes are implemented using technology at the service provider nodes.

The embodiments described below are not limited to implementations which solve any or all of the disadvantages of known cloud services equipment and processes.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Security management for cloud services is described. In various embodiments a cloud management node in a public cloud works together with a private management system in a private cloud to manage provisioning and access to cloud services from the private cloud. In various embodiments private data does not need to be held or duplicated in the public cloud so that security is enhanced. In various embodiments a private management system issues tokens for authorization so that user access to cloud services may be controlled. In some embodiments a cloud management node receives provisioning requests from a private cloud and selects and informs an appropriate service provider node that a provisioning request is waiting. In examples an administrator at a private cloud is able to manage cloud service access for many users in a simple effective manner and users are able to operate multiple cloud services from a single account.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
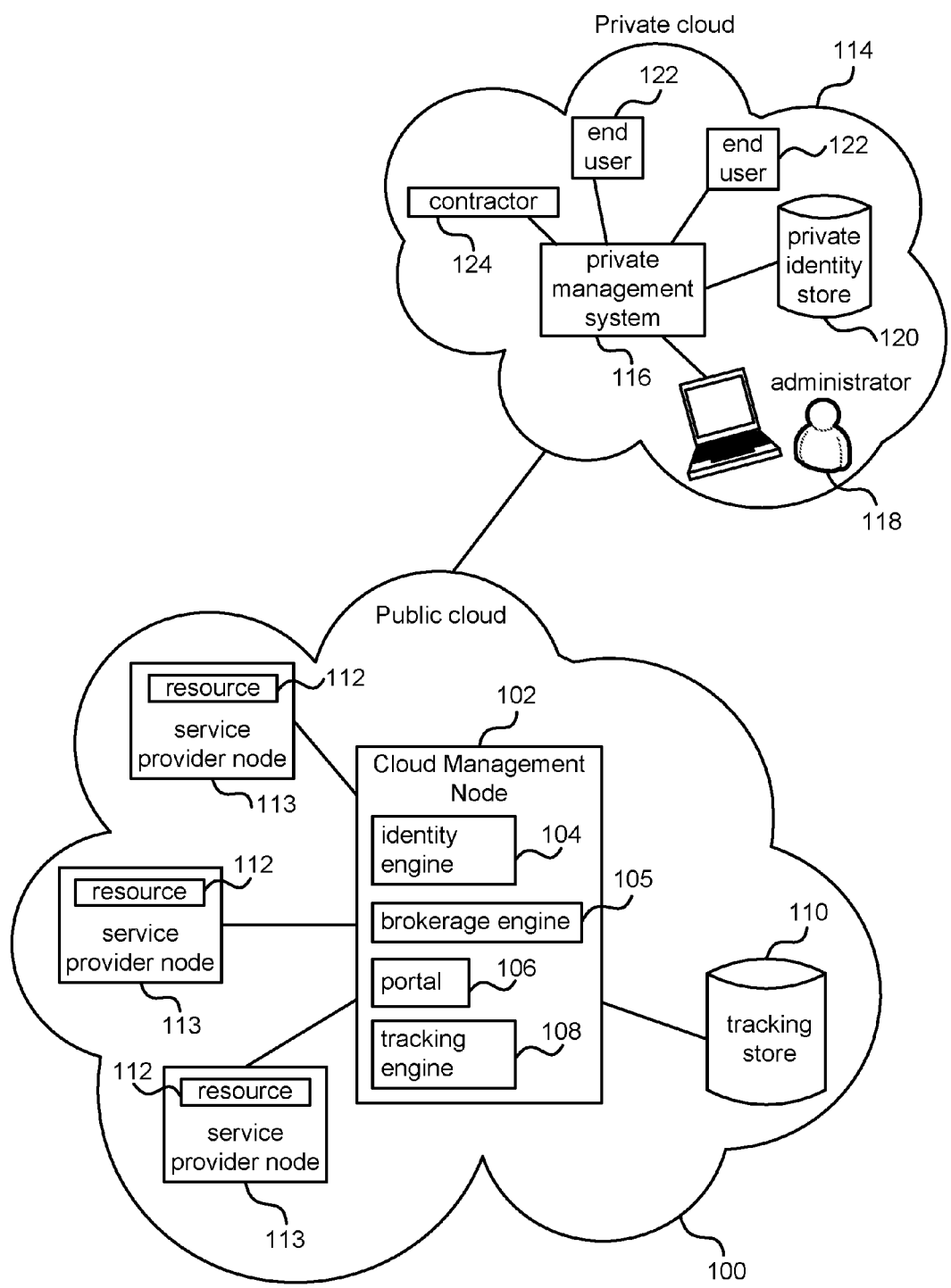
FIG. 1 is a schematic diagram of a communications network cloud through which services are available and with various entities for security management.

FIG. 1 is a schematic diagram of a communications network cloud through which services are available and with various entities for security management. A communications network cloud is any communications network having a plurality of nodes such as switches, routers, servers or other computing devices which are interconnected by communications links of any type such as wireless communications links or wired communications links such as Ethernet (trade mark), optical fiber or others. The communications network cloud comprises at least one private cloud 114 comprising a plurality of communications network nodes each having a private address known to entities in that cloud but not to other entities. For example the private cloud 114 may be connected behind a firewall to one or more public clouds 100 or other communications network nodes. In the example in FIG. 1 one private cloud 114 and one public cloud 100 are shown although additional public and private clouds and other communications network nodes may be present in practice. Communications network nodes in the public cloud 100 each have an address which is public and available to other nodes in the public or private clouds. In examples a private cloud may be an intranet of an enterprise, university, or other organization or a domestic home computing network. A private network may be geographically spread over many locations for example, where an enterprise has facilities in more than one country.

A plurality of service provider nodes 113 are provided in the public cloud 100 each comprising a resource 112 which is computer implemented. For example, the resource may be a computing resource and/or a software application. In an example, a service provider node 113 is arranged to provide an information retrieval system whereby other entities (which may be end users 122 and/or other service provider nodes) are able to obtain information retrieval results. The other entities which make use of the service provider node 113 may be in the public cloud 100 or in the private cloud 114.

Access to the service provider nodes may be controlled for security reasons and to prevent inappropriate or malicious use. For example, entities which access the service provider nodes may register with the service provider nodes or an associated node in the public cloud and as part of the registration process network address, identity data and other private data may be stored at the service provider nodes or other associated nodes in the public cloud. In order to access multiple different service provider nodes an end user 122 or other entity may register multiple times, once for each different service provider node. Once registration is successfully completed an end user or other entity may access service provider nodes where an authorization and/or authentication process is successfully completed at the service provider node. It is recognized here that such types of registration and authentication/authorization processes are complex, time consuming and also lead to security risks. For example, by making repeated requests to service provider nodes at very high volumes the service provider nodes are open to denial of service attacks by malicious entities. Also, there is a security risk in that the private data provided by end users during the registration process exists in the public cloud (potentially being duplicated many times in the public cloud) and so is potentially open to leaks to malicious entities. Also, it is difficult for end users or other entities to manage and keep track of all the different registrations they have and the security of the associated data in the public cloud. It is recognized here that communications with the service provider nodes changes over time as staff join, leave, change roles and where contractors are given access to service provider nodes for limited periods of time. This introduces additional complexity especially in ensuring security of data and managing authorization and authentication processes.

A cloud management node 102 may be provided in the public cloud 100 to facilitate security management for cloud services. The cloud management node 102 may be in communication with one or more of the service provider nodes 113 using any suitable communications protocol such as security assertion markup language (SAML), representational state transfer (REST) or other secure communications protocol. In the example in FIG. 1 the cloud management node 102 is shown as a single entity but this is not essential; the functionality of the cloud management node may be distributed over more than one entity.

The cloud management node 102 is computer implemented and comprises at least an identity engine 104, a brokerage engine 105, a portal 106 and a tracking engine 108. A tracking store 110 may be in communication with the cloud management node 102 or integral with the cloud management node. The identity engine is arranged to securely check identity and authorization details with one or more private management systems 116 in private clouds 114. Any private data that it stores is extremely limited and at most comprises redacted private identity data for example, in the form of security tokens (described in more detail later). Using the secure checking process and security tokens mitigates against breach of the private data. Private data does not need to be stored at duplicate locations in the public cloud.

The brokerage engine 105 comprises communications functionality arranged to receive provisioning requests and other inputs from entities requiring to use one or more service provider nodes 113. The brokerage engine 105 comprises functionality to select appropriate service provider nodes 113, to create messages in appropriate communications protocol formats and queue those, and to inform service provider nodes when appropriate that queued messages are present. Service provider nodes are then able to actively collect a secure queued message from the brokerage engine when allowed to do so by the brokerage engine 105. By enabling service provider nodes to actively collect secure messages in this way security is enhanced. For example, man in the middle attacks on service providers are less likely to succeed in enabling malicious entities to gain unauthorized access. Also, denial of service attacks on service providers are mitigated against. Often denial of service attacks are against public listening TCP or UDP ports. The methods described above with respect to the brokerage engine mitigate against public listening since message are sent to a private port which trigger an action by the service provider node to fetch a request.

A portal 106 is provided in the form of a web-based interface or other interface for enabling administrators 118, end users 122 or other entities to access the cloud management node 102 for example, for any of: provisioning, management and reporting of cloud services. A tracking engine 108 is arranged to track use of the various service provider nodes 113 and is able to access the tracking store 110 at which data about use of the service provider nodes is stored. The tracking engine may be arranged to monitor the queues at the brokerage engine 105 in order to record use of the various service providers.

The private cloud comprises a private management system 116 which is computer implemented and enables an administrator 118 or other operator(s) to manage provisioning and use of cloud services available in the public cloud 100. For example, the private cloud may be an intranet of an enterprise and the private management system 116 may be operable by an administrator at the enterprise who manages use of cloud services by staff of the enterprise such as end users 122, contractors 124 or other entities in the private cloud. The cloud services may be subscription based services in some cases and the private management system 116 enables an administrator 118 to manage accounts at those services, subscription levels and other provisioning and access factors. The private management system has access to a private identity store 120 which may hold private data about end users 122 such as staff or contactors and any authorizations for use of cloud services associated with those staff or contractors. The private identity store may be in a physically secure location at the enterprise premises or other secure location. It is located in the private cloud 114 and so is behind a firewall or other secure mechanism with respect to the public cloud 100 which reduces the risk of breach of the private data.

Figure 2:
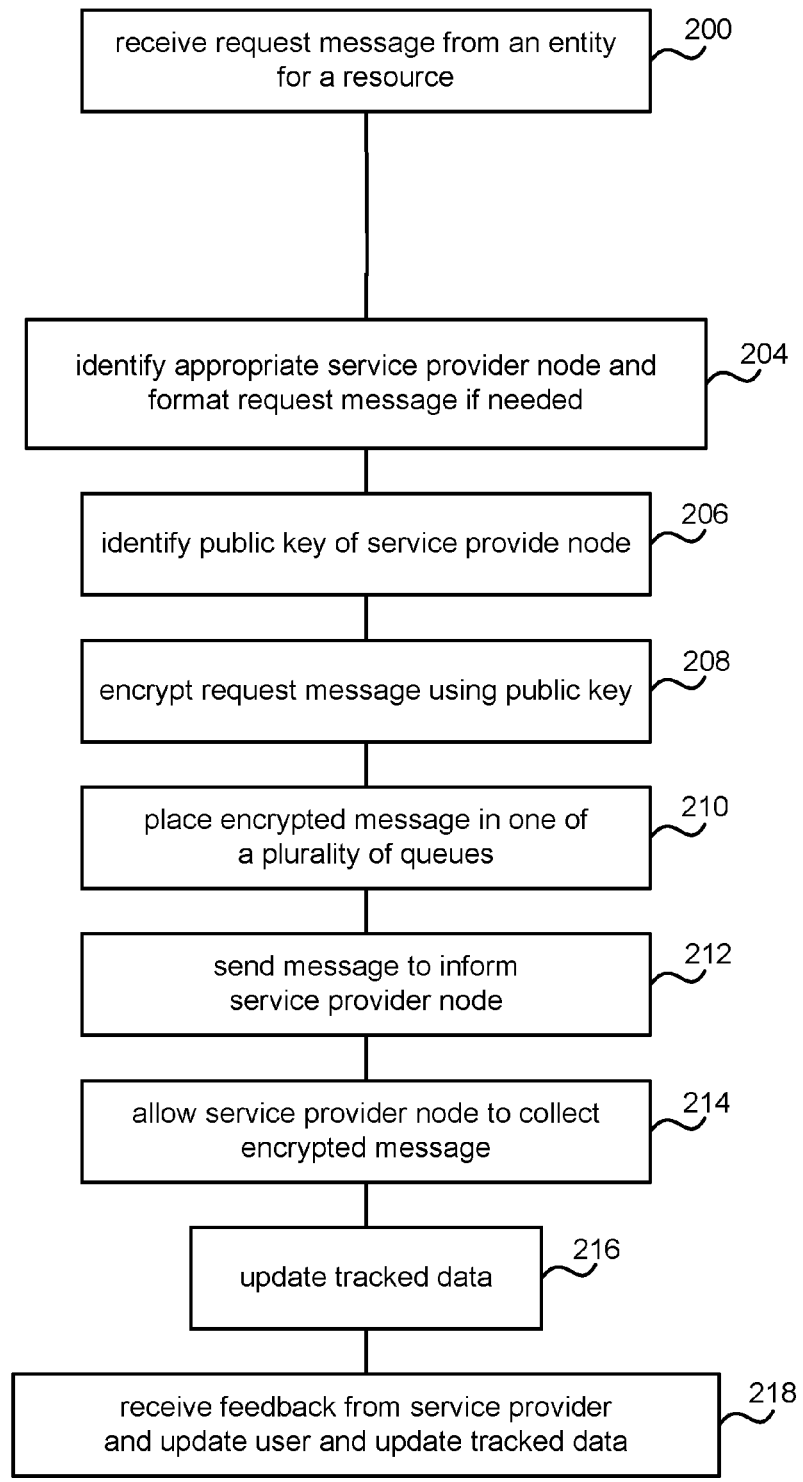
FIG. 2 is a flow diagram of a method at a cloud management node of securely provisioning or accessing a resource in a communications network cloud.

FIG. 2 is a flow diagram of a method at the cloud management node 102 of FIG. 1 for provisioning and/or accessing at least one cloud service from one or more service provider nodes 113. The cloud management node receives 200 a request message from an entity for a resource provided by a service provider node. For example, the entity may be a private management system 116 or a service provider node 113 itself (where one service provider node requests a resource of another service provider node). Where the entity is a private management system 116 the request message may be received at the portal 106. For example, an administrator 118 may access the portal 106 using a web-based interface or other interface via the private management system 116. The administrator may have an account at the portal and may log into this account before sending the request message. In this way the administrator 118 may send a message to the cloud management node 102 for provisioning one of the resources 112 of the service provider nodes in a secure, authenticated manner. In another example, an end user may be redirected to the cloud management node in order to access a cloud service (this is described in more detail later with reference to FIG. 4).

The request message comprises details of the sender of the request. The cloud management node 102 optionally verifies the sender of the request message as a result of the sender being logged onto the portal.

The request message comprises a provisioning request for example. In the case that an administrator requires to give two new members of staff access to a database service provided by service provider node A then the request message may comprise a request for two additional subscriptions from an enterprise associated with the specified private cloud but without comprising any private information about the individuals. In another example, the provisioning request may comprise a request to cancel one or more subscriptions, to create a new subscription to a service provider node, or to change quality of service levels or other functionality to be provided. The administrator updates the private management system such that user rights and access levels are recorded in the private identity store.

The request message comprises details of a resource (e.g software application or computing resource) that is required. The details may be one or more requirements rather than a specification of a resource provided by a particular service provider node. The requirements may relate to quality of service, functionality, pricing, or other factors. The cloud management node is arranged to identify 204 or select an appropriate service provider node given the details and knowledge of the resources. Rules or other criteria may be used by the cloud management node to make the selection. The cloud management node may take into account information about availability of the resources (such as current and projected workloads) and may take into account bandwidth limitations associated with the resources. The cloud management node formats the request message for a communications protocol used by the selected service provider node. (Different service provider nodes may use different communications protocols.)

The cloud management node identifies 206 a public key of the selected service provider node. For example, each service provider node has a public-private key pair established using a suitable cryptographic method and the public keys of the service provider nodes are known or accessible to the cloud management node.

The cloud management node encrypts the formatted request message using the public key of the selected service provider node. The secure, encrypted request message is then placed 210 into one of a plurality of queues at a brokerage engine of the cloud management node. For example, each queue is associated with one service provider node. A message is sent from the cloud management node to the selected service provider node to inform 212 the service provider node that a queued message is waiting. The service provider node is then able to collect 214 the encrypted message from the queue using SAML, REST or any other suitable communications protocol.

If the informing message is dropped, for example, because of a loss of communications between the service provider node and the cloud management node then the informing message may be resent after a delay. This is beneficial as if the formatted request message were immediately forwarded to the selected service provider node, and lost due to packets being dropped, then the administrator or other entity would need to repeat the provisioning request.

The service provider node is able to decrypt the message and obtain the provisioning request and details of the sender (such as the private cloud or private management system). The service provider node does not obtain private data of the staff or other individuals associated with the provisioning request.

As messages are taken from the queues at the brokerage engine a tally or other record is updated 216. This may be used to provide a record of subscriptions to the various service provider nodes by the private management system. The record may be a useful cross-check for private management systems and service provider nodes where these entities also keep their own records.

The service provider node actions the provisioning request, for example, by adding subscriptions or cancelling subscriptions. The service provider node may send feedback to the cloud management node indicating whether the provisioning requests have been successfully auctioned. The feedback is received 218 at the cloud management node and used to update the user (private management system or other entity) and optionally also to update the tracked data.

Figure 3:
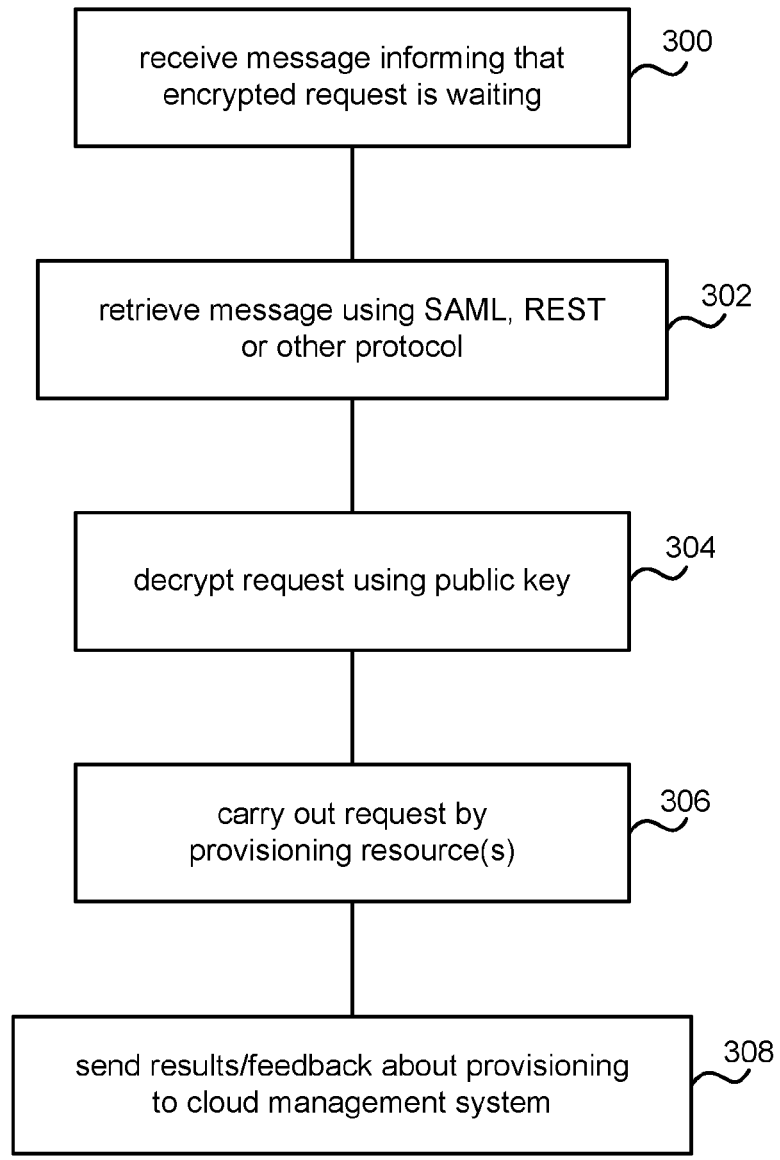
FIG. 3 is a flow diagram of a method at a service provider node.

FIG. 3 is a flow diagram of a method at a service provider node for provisioning one or more resources associated with the service provider node. A message is received from a cloud management node informing 300 that an encrypted message is waiting at the cloud management node. The service provider node retrieves 302 the encrypted message using SAML, REST or another protocol. It decrypts 304 the message using its public key and carries out a provisioning request contained in the message by provisioning 306 one or more resources associated with the service provider node. Results of the provisioning action may be sent 308 to the cloud management system.

Figure 4:
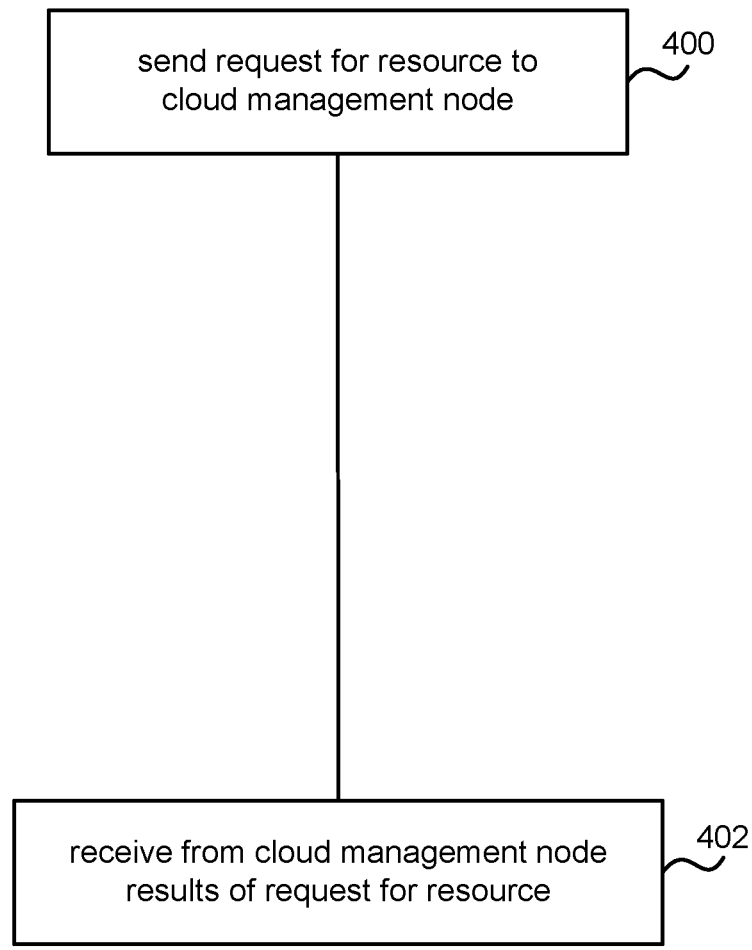
FIG. 4 is a flow diagram of a method at a private management system.

FIG. 4 is a flow diagram of a method for provisioning one or more resources associated with a service provider node. The method may be carried out by a private management system or by an end user or other entity in a private cloud of the private management system. A provisioning request for a resource is sent 400 to a cloud management node. For example, the private management system knows the address of the cloud management node and sends the request message directly using SAML, REST or another suitable protocol. In another example, the request is sent by using a web-based interface such as the portal 106 of FIG. 1 of the cloud management node and the sender is logged onto the portal. The request may be a message comprising details of the sender, and a request for a resource to be provisioned in a specified manner (by adding subscriptions for example). The private management system may receive 402 results of the provisioning request from the cloud management node.

Figure 5:
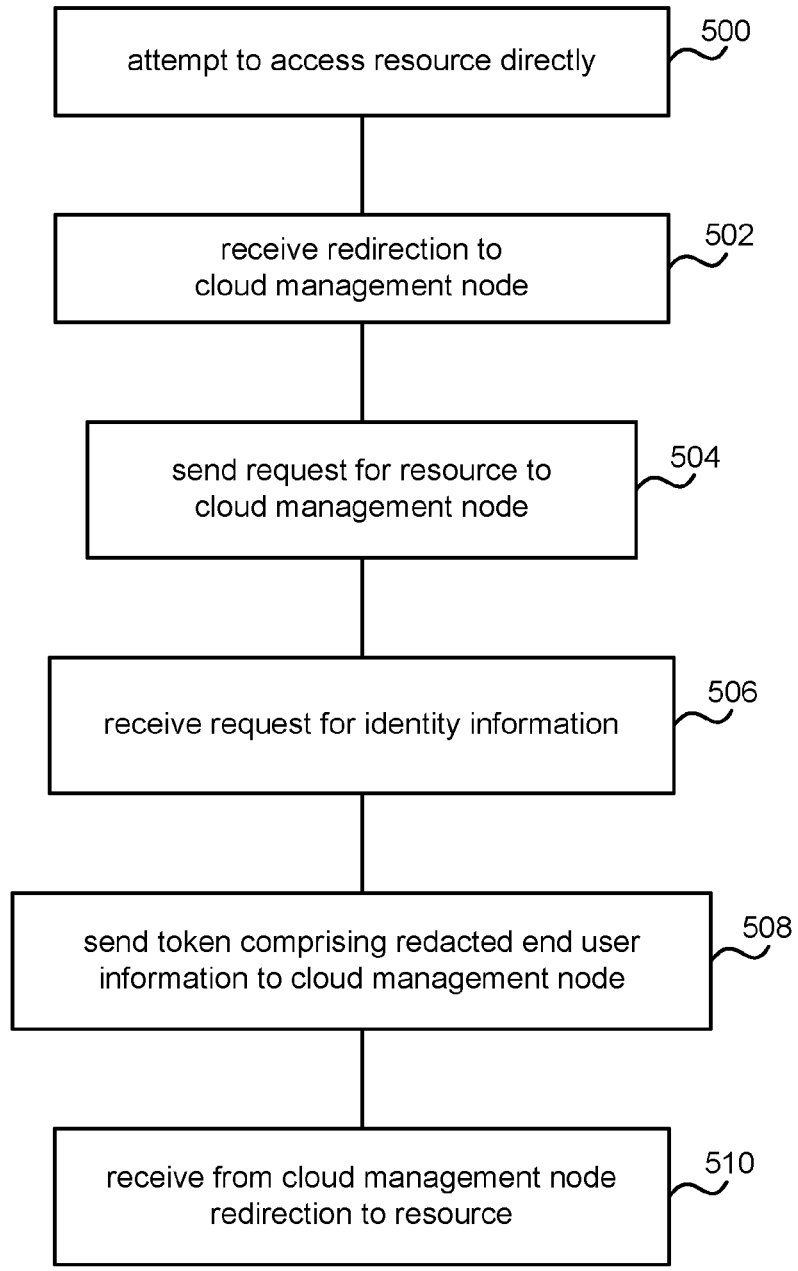
FIG. 5 is a flow diagram of a method of securely accessing a cloud service.

FIG. 5 is a flow diagram of a method of accessing a cloud service. An entity which desires to access a cloud service, such as an end user (see 122 in FIG. 1) who may be a member of staff or a contractor (see 124 in FIG. 1) in a private cloud 114 attempts 500 to access a cloud service directly. For example, by sending a message or making a request using a web-based interface to a service provider node 113 associated with the cloud service. The attempt to access the resource of the cloud service is direct in the sense that it does not travel via the cloud management node (see 102 of FIG. 1). The access attempt comprises a message or request which may have a flag or mark which indicates to the service provider node that the attempt is associated with a particular cloud management node 102. However, this is not essential. The access attempt need not comprise any private information of the end user or other entity making the access attempt.

The service provider node 113 receives the access attempt and may have no information from the access attempt to indicate whether the entity is authorized to access the resource. The service provider node may refuse access to the resource and send a message to the entity which redirects the entity to the cloud management node 102. The entity which desires to access the resource receives 502 a redirection to the cloud management node 102. For example, the service provider node may send this redirection using pre-configured information about the address of the service provider node.

The entity which desires to access the resource sends 504 a request to access the resource to the cloud management node. This request may comprise an identity of the private cloud 114 and details of at least one resource 112 to be accessed. The details may be an identifier of a particular service provider or requirements of resources that the entity would prefer to access. The request comprises an identifier of the end user or other entity making the request but need not comprise any other private data such as access level rights of the end user.

The cloud management node receives the request for access. It knows the identity of the private cloud from which the request was made. It sends a request to a private management system 116 of that private cloud for identity information. The request comprises an identifier of the end user or other entity making the request. The private management system receives 506 the request for identity information. The private management system accesses the private identity store 120 to find private data associated with the identifier of the end user or other entity. For example, it finds which services the end user is authorized to use and which user rights and access levels the end user has.

The private management system generates a token comprising redacted end user information. The token is generated using the information accessed from the private identity store. For example, a token comprises claims that define an entity's access and user rights for one or more resources at the service provider nodes. The token may be encrypted using any suitable cryptographic technique.

The private management system sends 508 the token comprising redacted end user information to the cloud management node. The cloud management node checks the token (after decryption if appropriate) and if the check is successful the cloud management node issues a cloud secured token which it sends in a message to the end user or other entity. The message directs that entity to the resource and the resource uses the token to authenticate and/or authorize access to the resource. The end user or other entity thus receives 510 from the cloud management node a redirection to the resource. The token need not be stored at the cloud management node after use so that any redacted private data is not stored in the public cloud.

Figure 6:
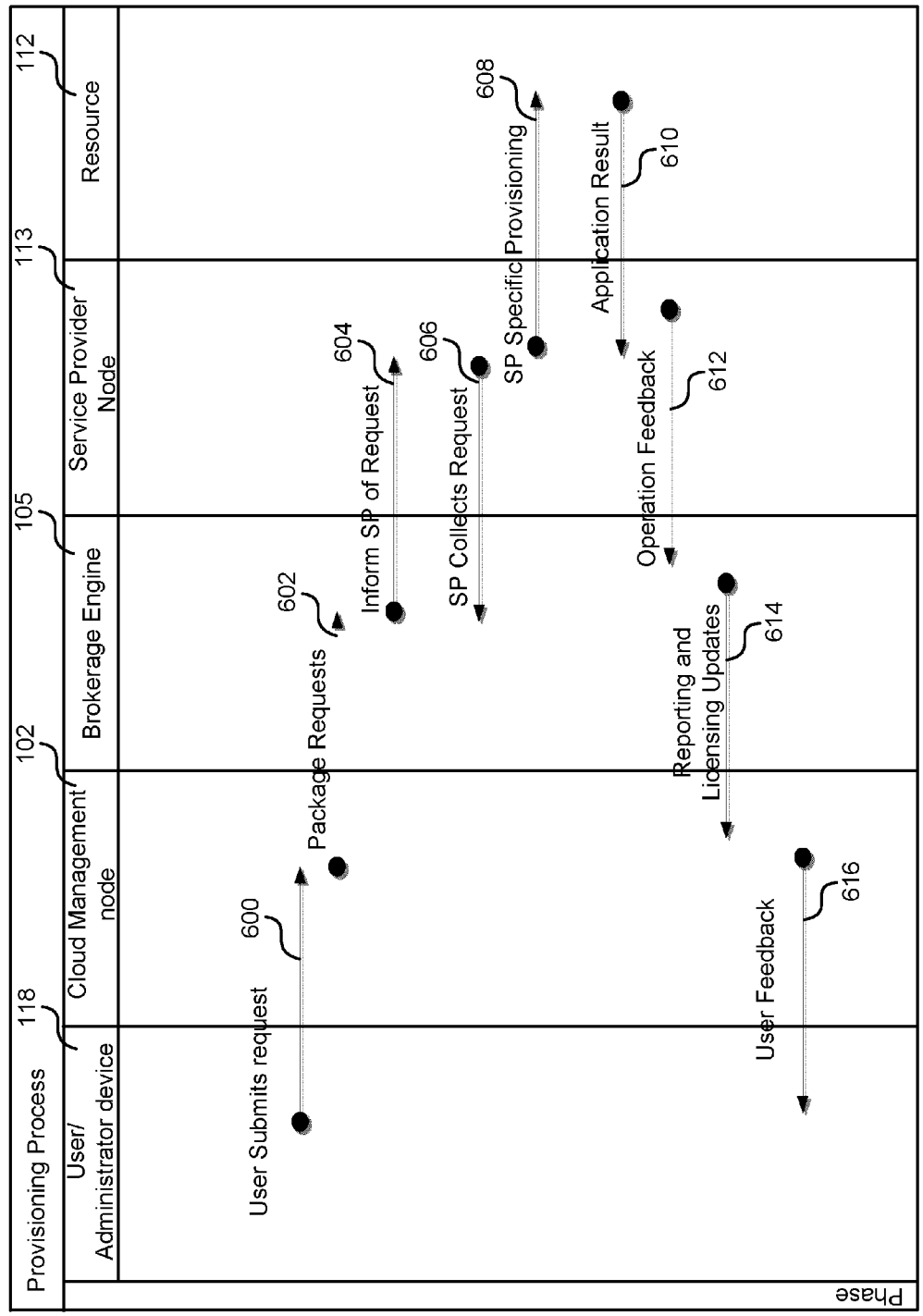
FIG. 6 is a message sequence chart of a secure provisioning process for cloud services.

FIG. 6 is a message sequence chart for a method of provisioning a resource 112 associated with a service provider node 113. Various of the entities of FIG. 1 are each represented using a column in FIG. 6 and messages between the entities are represented using arrows where the direction of the arrow shows the direction of the message. The relative position of the arrows vertically on the page represents the chronological order of the messages.

A user or administrator device 118 in a private cloud submits a request 600 to a cloud management node 102 for provisioning a resource 112 of a service provider node 113. The cloud management node 102 selects an appropriate service provider node and formats or packages 602 the request message appropriately as described above. It places the formatted, encrypted request message into one of a plurality of queues at a brokerage engine 105 of the cloud management node 102. The brokerage engine informs 604 the service provider node 113 that an item is in the queue. The service provider node 113 collects 606 the request message from the queue. The service provider node decrypts and actions 608 the provisioning request and results of the provisioning action are returned as an application result 610 from the resource 112 to the service provider node 113. Operation feedback 612 is sent from the service provider node to the brokerage engine 105 and reporting and licensing updates 614 are made by the brokerage engine to a tracking engine at the cloud management node 102. The cloud management node may send 616 feedback of the provisioning to the user.

Figure 7:
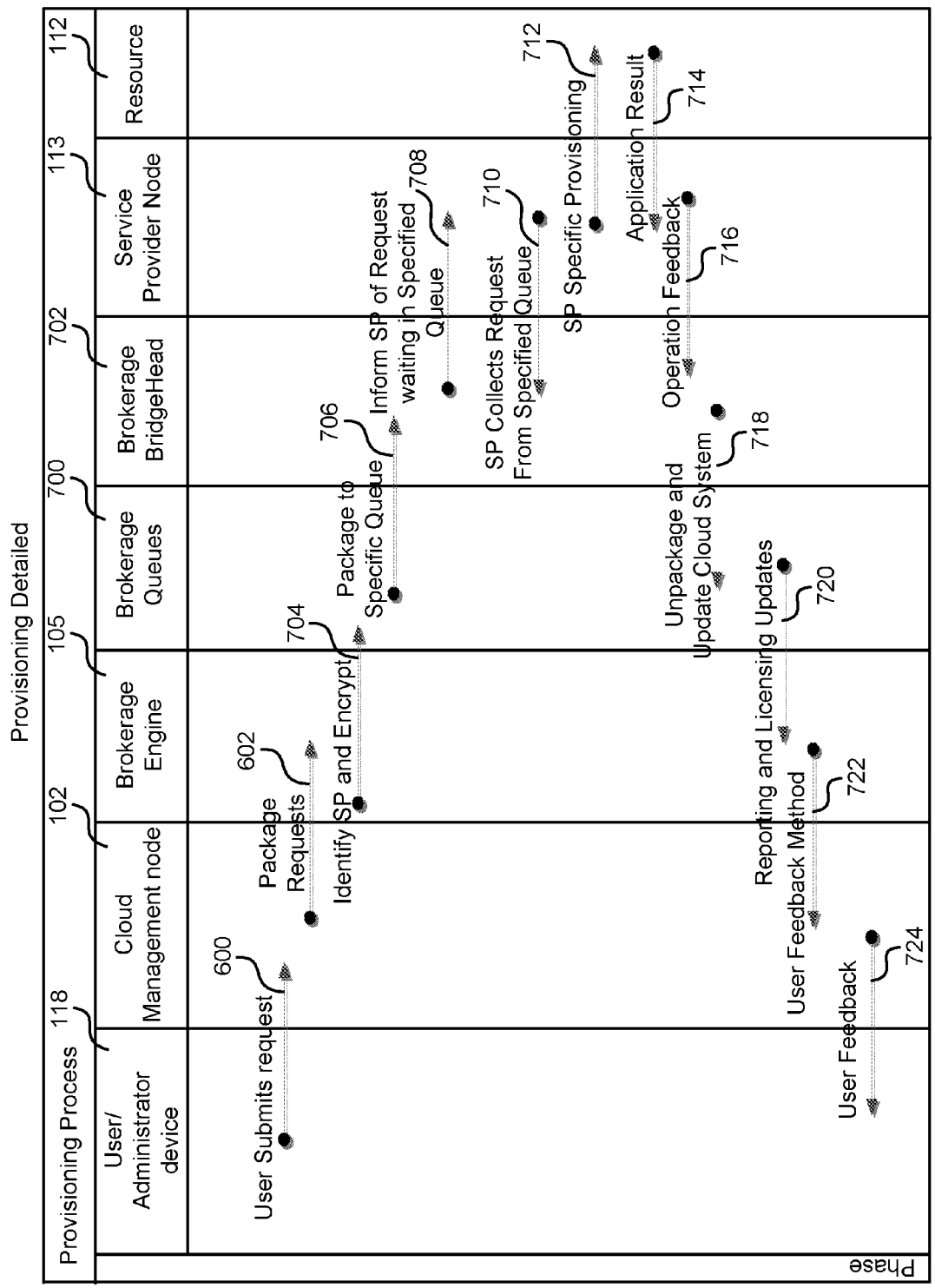
FIG. 7 is the message sequence chart of FIG. 6 with more detail.

FIG. 7 is a message sequence chart of the process of FIG. 6 with more detail. Here the brokerage engine 105 comprises brokerage queues 700 and a brokerage bridgehead 702. The method proceeds as in FIG. 6 with the brokerage engine 105 identifying 704 an appropriate service provider node and encrypting the formatted provisioning request message. The encrypted message is placed in a specific queue 706 and the brokerage bridgehead 702 informs 708 the service provider node of the request waiting in a specified queue. The service provider node collects 710 the request from the specified queue. The service provider node decrypts and actions 712 the provisioning request and results of the provisioning action are returned as an application result 714 from the resource 112 to the service provider node 113. Operation feedback 716 is sent from the service provider node to the brokerage bridgehead 702. The feedback is unpackaged 718 and the cloud system updated. Reporting and licensing updates 720 are made by the brokerage queues to the brokerage engine and a user feedback method 722 occurs between the brokerage engine and the cloud management node. The cloud management node may send 724 feedback of the provisioning to the user.

Figure 8:
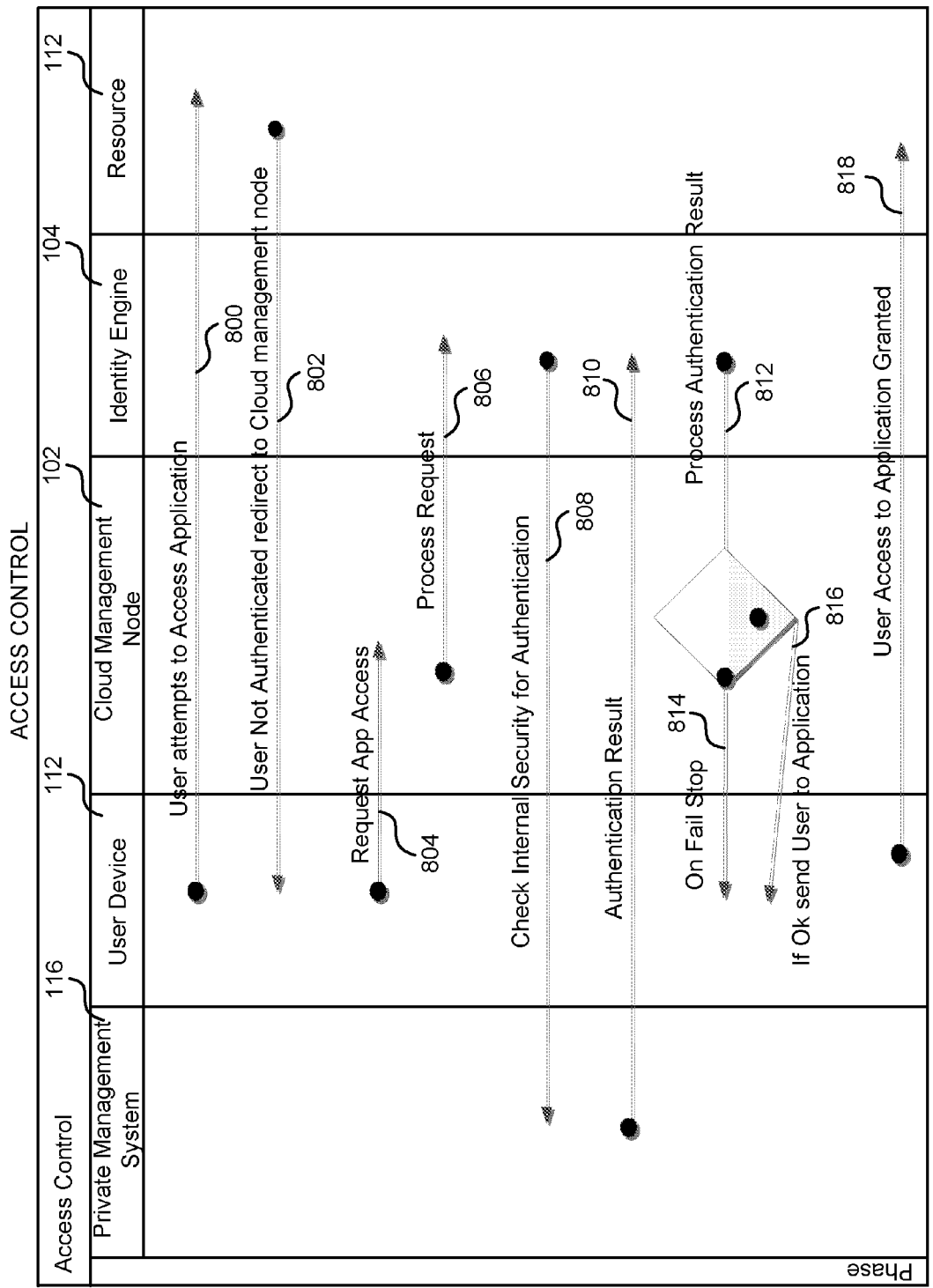
FIG. 8 is a message sequence chart of a secure access control process for cloud services.

FIG. 8 is a message sequence chart for a method of access control. Various of the entities of FIG. 1 are each represented using a column in FIG. 8. A user device 112 attempts 800 to access a resource 112 of a service provider node. This attempt fails as the user is not authenticated. For example, the service provider carries out its own authentication checks and these fail as the user device 112 is not previously registered at the service provider using the service providers own procedures where private data is stored at the service provider. The service provider node or resource 112 sends a message 802 to the user device which asks the user device to access the cloud management node. The user device 112 sends a request 804 to the cloud management node requesting access to the application or resource 112. The cloud management node processes that request by sending 806 a request to the identity engine 104. The identity engine 104 sends a message 808 to the private management system 116 asking it to authenticate. The authentication result (comprising a token as described above) is sent 810 from the private management system 116 to the identity engine 104. The identity engine sends 812 the token to a checking process at the cloud management node 102. If the check fails a stop message is sent 814 to the user device.

If the check is successful a message 816 is sent to the user device 112 that enables it to access 818 the resource 122.

Figure 9:
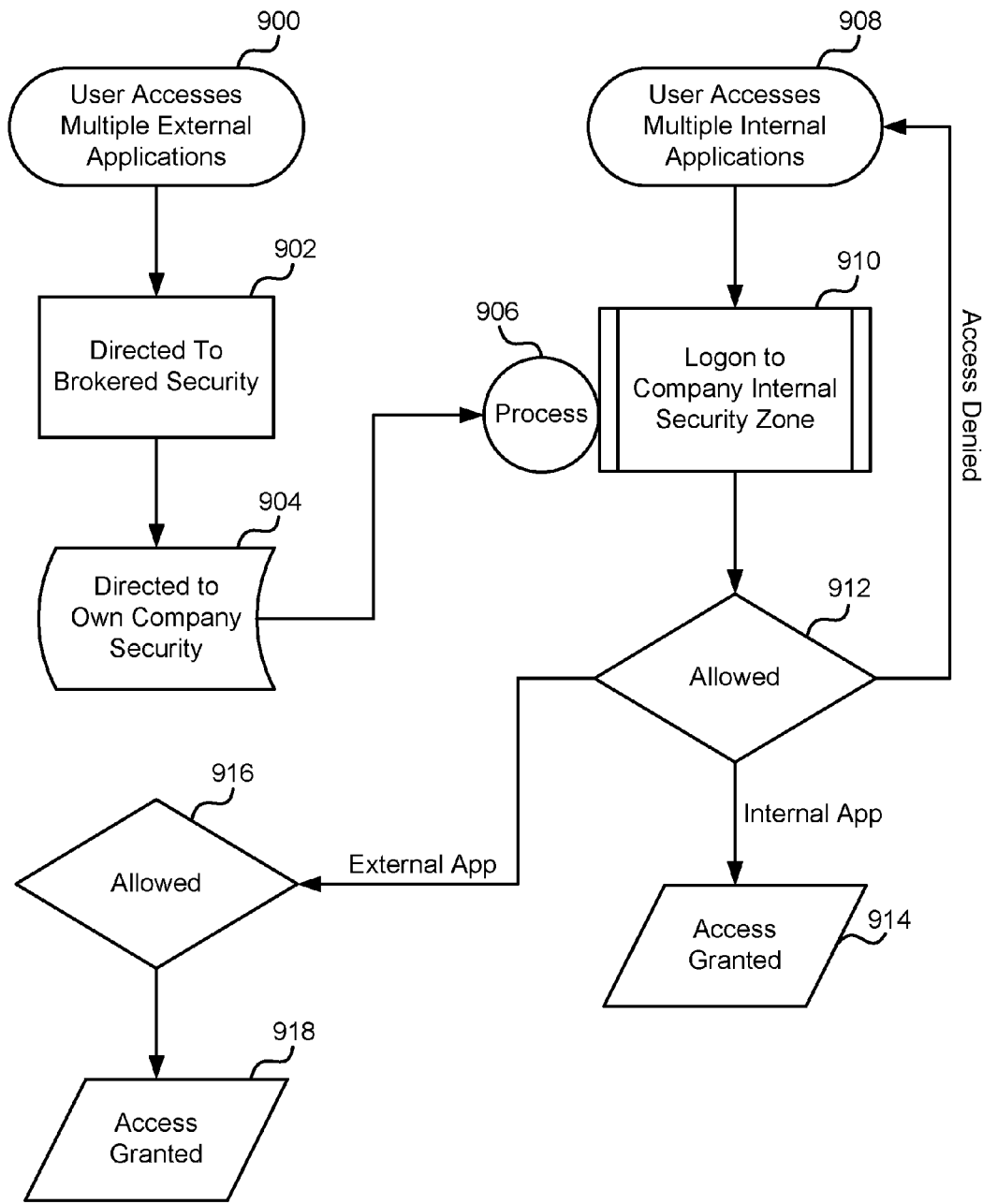
FIG. 9 is a flow diagram of another secure access control process.

FIG. 9 is a flow diagram of a method of enabling a user or other entity at a private cloud to access both internal resources (service provider nodes located within the private cloud) and external resources (service provider nodes located in the public cloud). A user at a user device in a private cloud accesses 900 one or more external applications (service provider nodes in the public cloud). The user device is directed 902 to brokered security. For example, this is achieved as in the methods of FIGS. 5 and/or 8 by the service provider node sending a message to the user device which directs the user device to the cloud management node. The cloud management node directs the user device to the private management system referred to in FIG. 9 as the "own company security". A process 906 occurs which enables the user to logon 910 to the company internal security zone (or private management system). If the private management system is able to authenticate the user access is allowed 912, 916 to both external resources 918 and internal resources 914. The user is able to access multiple internal applications 908 as well as external applications.

Using the process of FIG. 9 a single user has only one account which is at the private management system. There is no need for separate accounts at each of the internal or external resources. Also there is no need for account security information to be replicated or present in the public cloud. Also if a user leaves then only one account needs to be disabled.

Figure 10:
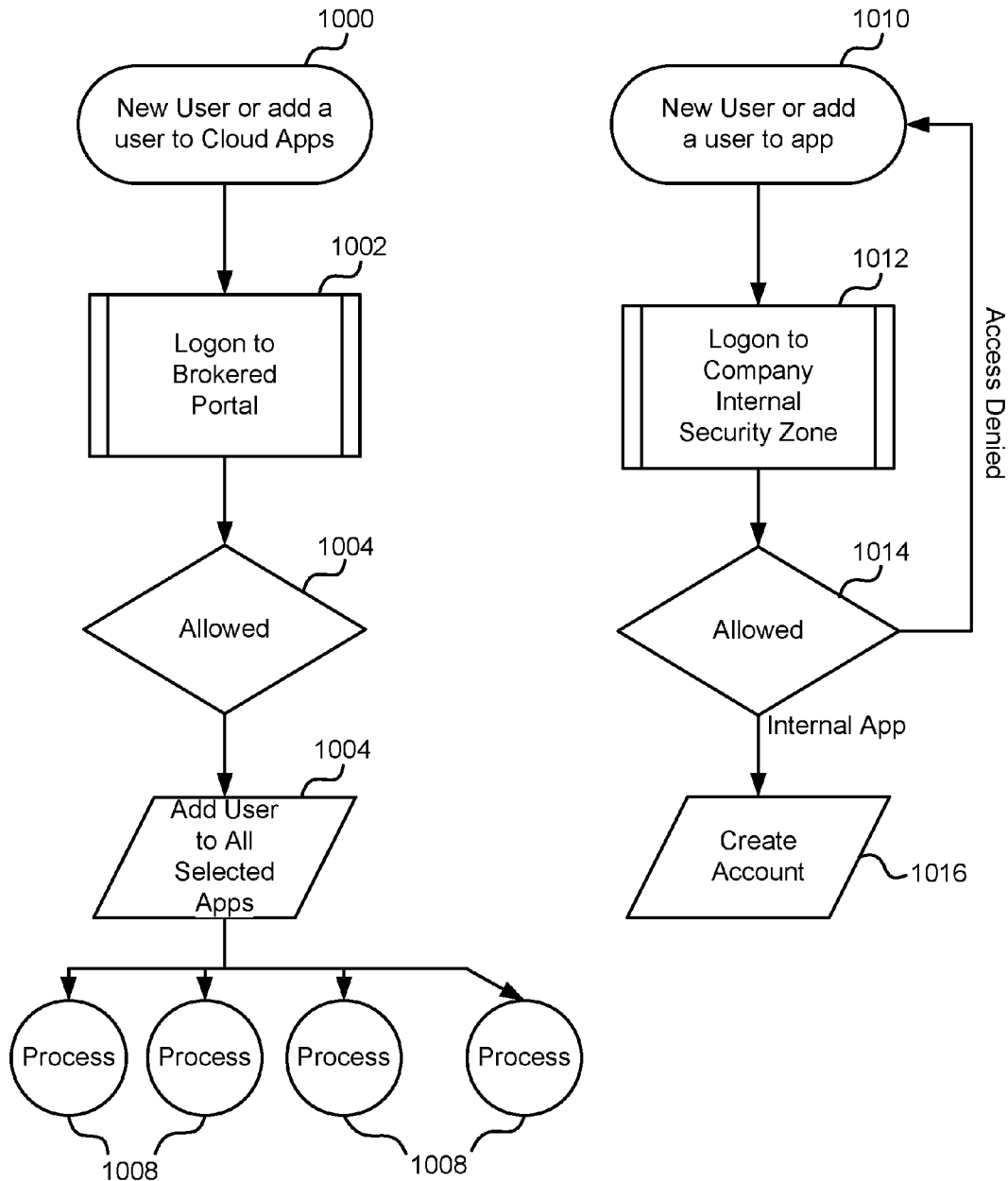
FIG. 10 is a flow diagram of a method of an operator/administrator at a private domain for giving end users access to one or more cloud services.

FIG. 10 is a flow diagram of a method of provisioning a cloud service such as by adding users (or subscriptions) to a cloud service. There may be a new user or a need to add 1000 a user to one or more cloud services. An administrator logs on 1002 to a brokered portal such as the portal 106 of the cloud management node 102 of FIG. 1. If logon is successful the administrator is allowed 1004 and adds 1006 the user to all the selected resources or applications 1008. The administrator also updates the private management system with the provisioning information. When there is a new user or a need to add a user to one or more applications the administrator logs on 1012 to the private management system. If logon is successful the administrator 1014 is allowed to create an account 1016 for the new user or update an existing account.

In this way an administrator at an enterprise or other organization need only use the broker portal to add user to the applications in one place. The cloud management system provisions the users accordingly across multiple cloud services.

Figure 11:
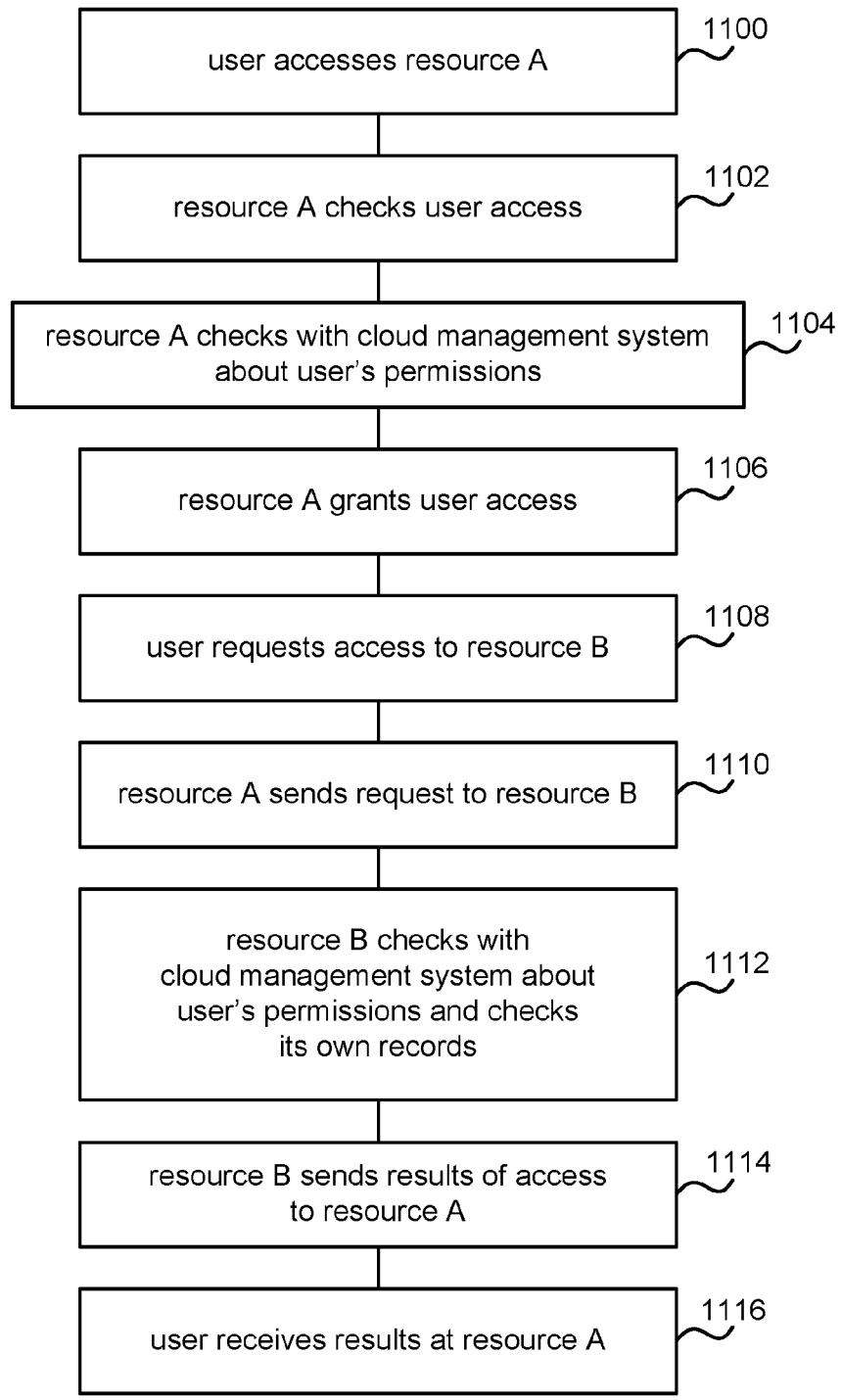
FIG. 11 is a flow diagram of a method at a first cloud resource for securely accessing a second cloud resource.

FIG. 11 is a flow diagram of a method of enabling a resource (provided by a service provider node) to access another resource (provided by a different service provider node). A user accesses 1100 resource A. Resource A optionally checks 1102 that the user is authorized using its own authorization processes. Resource A checks 1104 with the cloud management node about the user's permissions for the resource A. For example, the cloud management node obtains a token from the private management system as described above. If the check is successful resource A grants 1106 the user access. The user now makes a request 1108 to use resource B. That is, the user makes an action at resource A which causes an application at resource A to send 1110 a request to resource B. For example to obtain some data or for other reasons. Resource B checks 1112 with the cloud management system about the user's permissions and optionally checks its own records. If the checks are successful then resource B sends 1114 the results of the access to resource A. For example, it sends the data to resource A. The user then receives 1116 the results at resource A.

Figure 12:
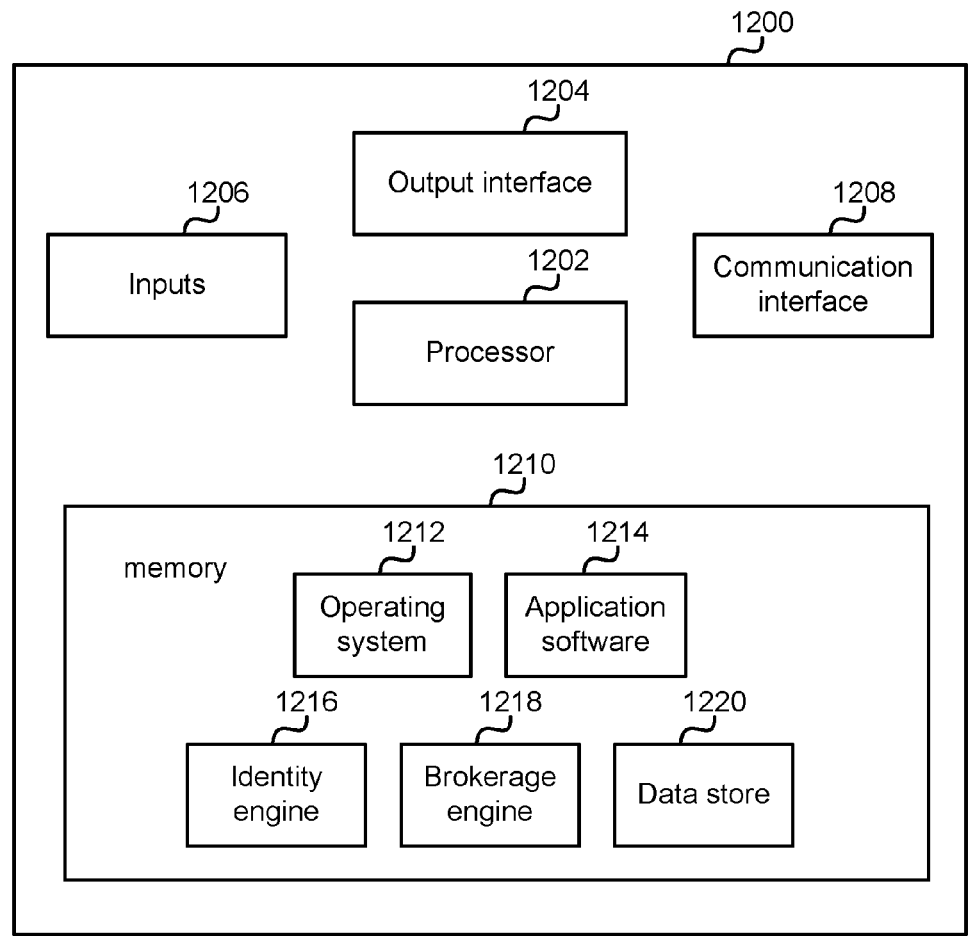
FIG. 12 illustrates an exemplary computing-based device in which embodiments of an entity used for security management for cloud services may be implemented.

FIG. 12 illustrates various components of an exemplary computing-based device 1200 which may be implemented as any form of a computing and/or electronic device, and in which embodiments of an entity for security management of cloud services may be implemented.

The computing-based device 1200 comprises one or more inputs 1206 which are of any suitable type for receiving media content, Internet Protocol (IP) input, input from entities in a private cloud or other input. The device also comprises communication interface 1208 which enables it to communicate with other entities in a communications network. For example, service provider nodes, user devices, private management systems, cloud management nodes or other entities.

Computing-based device 1200 also comprises one or more processors 1202 which may be microprocessors, controllers or any other suitable type of processors for processing computer executable instructions to control the operation of the device in order to manage provisioning and/or access to service provider nodes. In some examples, for example where a system on a chip architecture is used, the processors 1202 may include one or more fixed function blocks (also referred to as accelerators) which implement a part of any of the methods described herein in hardware (rather than software or firmware). Platform software comprising an operating system 1212 or any other suitable platform software may be provided at the computing-based device to enable application software 1214 to be executed on the device. In the case that the computing based device is a cloud management node it may comprise an identity engine 1216 and a brokerage engine 1218. It may comprise a data store 1220 holding tracked data, rules and criteria or other information.

The computer executable instructions may be provided using any computer-readable media that is accessible by computing based device 1200. Computer-readable media may include, for example, computer storage media such as memory 1210 and communications media. Computer storage media, such as memory 1210, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 1210) is shown within the computing-based device 1200 it will be appreciated that the storage may be distributed or located remotely and accessed via a network or other communication link (e.g. using communication interface 1208).

An output interface 1204 is also provided such as an audio and/or video output to a display system integral with or in communication with the computing-based device. The display system may provide a graphical user interface, or other user interface of any suitable type although this is not essential.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented security management method comprising a plurality of steps executed at at least one management node in a public domain of a communications network, the steps comprising:
   receiving a request message associated with a user for a resource provided by at least one service provider node in a public domain of the communications network;
   authorizing the request message using information at a private management system in a private cloud of the communications network associated with the user;
   enabling access to the service provider node if a check is successful;
   sending a message to the service provider node to inform the service provider node that the request message is available at the management node; and
   allowing the service provider node to collect the request message from the management node.

2. A method as claimed in claim 1 wherein authorizing the request message comprises receiving a token from the private management system the token specifying access of the user to the resource.

3. A method as claimed in claim 1 or claim 2 wherein the request message is received as a result of a redirection from the service provider node.

4. A method as claimed in claim 1 wherein the request message is received from a service provider node.

5. A method as claimed in claim 1 wherein authorizing the request message is achieved as a result of the user being logged onto a portal of the management node.

6. A method as claimed in claim 1 further comprising identifying a public key associated with the service provider node and encrypting the request message using the identified public key.

7. A method as claimed in claim 1 comprising receiving the request message comprising requirements of a resource and selecting one of a plurality of service provider nodes at least on a basis of the requirements and information about resources associated with the service provider nodes.

8. A method as claimed in claim 1 comprising formatting the request message according to a communications protocol of the service provider node.

9. A method as claimed in claim 1 comprising placing the request message into one of a plurality of queues, each queue being associated with a particular service provider or resource.

10. A method as claimed in claim 9 comprising storing data for each queue such that data by service provider and/or resource is obtained.

11. A method as claimed in claim 1 wherein allowing the service provider node to collect the message comprises enabling a service provider node to collect an encrypted message using representational state transfer (REST).

12. A method as claimed in claim 1 comprising receiving feedback from the service provider node about an operation triggered by the request message and sending information to the user about the feedback.

13. A method as claimed in claim 1 comprising storing data comprising details of messages collected by the service provider node.

14. A method as claimed in claim 1 comprising receiving the request message from a service provider node which requests to use a second resource associated with a second, different service provider node.

15. A management node in a public domain of a communications network comprising:
- an input arranged to receive a request message associated with a user for a resource provided by at least one service provider node in a public domain of the communications network;
- a processor arranged to authorize the request message using information at a private management system in a private cloud of the communications network associated with the user;
- the processor being arranged to enable access to the service provider node if a check is successful;
- an output arranged to send a message to the service provider node to inform the service provider node that the request message is available at the management node; and
- the processor being arranged to allow the service provider node to collect the request message from the management node.

16. The management node of claim 15, the processor arranged to authorize the request message using a token received from the private management system the token specifying access of the user to the resource.

17. The management node of claim 15, the input arranged to receive the request message as a result of a redirection from the service provider node.

18. The management node of claim 15, the input arranged to receive the request from a service provider node.

19. One or more non-transitory computer-readable storage media storing computer-readable instructions that when executed by a processor of a computer cause the computer to perform acts at at least one management node in a public domain of a communications network, the acts comprising:
- receiving a request message associated with a user for a resource provided by at least one service provider node in the public domain of the communications network;
- authorizing the request message using information at a private management system in a private cloud of the communications network associated with the user;
- enabling access to the service provider node if a check is successful;
- sending a message to the service provider node to inform the service provider node that the request message is available at the management node; and
- allowing the service provider node to collect the request message from the management node.

* * * * *